US00RE45640E

(19) United States
(12) Reissued Patent
Gotoh et al.

(10) Patent Number: US RE45,640 E
(45) Date of Reissued Patent: Aug. 4, 2015

(54) PHOSPHOR FOR ELECTRON BEAM EXCITATION AND COLOR DISPLAY DEVICE USING THE SAME

(75) Inventors: Masahiro Gotoh, Tokyo (JP); Akira Nagatomi, Tokyo (JP); Kenji Sakane, Tokyo (JP); Shuji Yamashita, Tokyo (JP)

(73) Assignees: DOWA ELECTRONICS MATERIALS CO., LTD., Tokyo (JP); NICHIA CORPORATION, Anan-shi (JP)

(21) Appl. No.: 13/417,146

(22) Filed: Mar. 9, 2012

Related U.S. Patent Documents

Reissue of:
(64) Patent No.: 7,138,756
Issued: Nov. 21, 2006
Appl. No.: 10/949,312
Filed: Sep. 27, 2004

(30) Foreign Application Priority Data

Aug. 2, 2004 (JP) ..... 2004-225688

(51) Int. Cl.
*C09K 11/08* (2006.01)
*C09K 11/77* (2006.01)
*H01J 29/20* (2006.01)

(52) U.S. Cl.
CPC ..... *C09K 11/7734* (2013.01); *H01J 29/20* (2013.01)

(58) Field of Classification Search
CPC ..... C09K 11/7734; H01J 29/20
USPC ..... 313/467, 468; 252/301.4 R, 301.6 R, 252/301.4 F, 301.6 F
See application file for complete search history.

(56) References Cited

U.S. PATENT DOCUMENTS

| | | | |
|---|---|---|---|
| 18,985 | A | 12/1857 | Olds |
| 2,121,275 | A | 6/1938 | Zober et al. |
| 3,527,595 | A | 9/1970 | Adler |
| 3,697,301 | A | 10/1972 | Donofrio et al. |

(Continued)

FOREIGN PATENT DOCUMENTS

| | | |
|---|---|---|
| EP | E 459 156 A2 | 4/1991 |
| EP | 1 296 376 A2 | 3/2003 |

(Continued)

OTHER PUBLICATIONS

US Office Action received in U.S. Appl. No. 13/100,751 dated Dec. 21, 2012.

(Continued)

*Primary Examiner* — Nimeshkumar Patel
*Assistant Examiner* — Christopher Raabe
(74) *Attorney, Agent, or Firm* — Foley & Lardner LLP

(57) ABSTRACT

A phosphor, which has less reduction in emission efficiency and is capable of keeping high luminance even when density of an electron beam for exciting the phosphor increases, is provided. As raw materials, $Ca_3N_2$ (2N), AlN (3N), $Si_3N_4$ (3N), and $Eu_2O_3$ (3N) are prepared, and each of the raw materials is weighed so that a mole ratio of each element is, for example, (Ca+Eu):Al:Si=1:1:1, and mixed, then the mixture is held and fired at 1500° C. under the inert atmosphere for three hours, and thereafter ground to produce a phosphor having a composition formula of $Ca_{0.985}SiAlN_3:Eu_{0.015}$.

7 Claims, 3 Drawing Sheets

(56) References Cited

U.S. PATENT DOCUMENTS

| | | | | |
|---|---|---|---|---|
| 4,477,689 | A | 10/1984 | Ogasahara et al. | |
| 4,576,736 | A | 3/1986 | Harmuth | |
| 5,398,398 | A | 3/1995 | Williams et al. | |
| 5,447,291 | A * | 9/1995 | Sandhage | 148/516 |
| 5,600,202 | A | 2/1997 | Yamada et al. | |
| 6,180,029 | B1 | 1/2001 | Hampden-Smith et al. | |
| 6,504,297 | B1 | 1/2003 | Heo et al. | |
| 6,642,652 | B2 | 11/2003 | Collins et al. | |
| 6,670,748 | B2 | 12/2003 | Ellens et al. | |
| 7,138,756 | B2 | 11/2006 | Gotoh et al. | |
| 7,252,788 | B2 | 8/2007 | Nagatomi et al. | |
| 7,345,418 | B2 | 3/2008 | Nagatomi et al. | |
| 7,432,647 | B2 | 10/2008 | Nagatomi et al. | |
| 7,443,094 | B2 | 10/2008 | Sakane et al. | |
| 7,445,730 | B2 | 11/2008 | Nagatomi et al. | |
| 7,476,336 | B2 | 1/2009 | Nagatomi et al. | |
| 7,477,009 | B2 | 1/2009 | Nagatomi et al. | |
| 7,514,860 | B2 | 4/2009 | Nagatomi et al. | |
| 8,048,338 | B2 | 11/2011 | Nagatomi et al. | |
| 2002/0043926 | A1 | 4/2002 | Takahashi et al. | |
| 2003/0020028 | A1 | 1/2003 | Iihama et al. | |
| 2003/0030038 | A1 * | 2/2003 | Mitomo et al. | 252/500 |
| 2003/0030368 | A1 | 2/2003 | Ellens et al. | |
| 2003/0094893 | A1 | 5/2003 | Ellens et al. | |
| 2003/0132422 | A1 | 7/2003 | Tian et al. | |
| 2003/0152804 | A1 | 8/2003 | Miura et al. | |
| 2003/0213611 | A1 | 11/2003 | Morita | |
| 2004/0155225 | A1 * | 8/2004 | Yamada et al. | 252/301.4 R |
| 2004/0263074 | A1 | 12/2004 | Baroky et al. | |
| 2005/0001225 | A1 | 1/2005 | Yoshimura et al. | |
| 2005/0189863 | A1 * | 9/2005 | Nagatomi et al. | 313/486 |
| 2005/0203845 | A1 | 9/2005 | Yoshimine et al. | |
| 2005/0205845 | A1 * | 9/2005 | Delsing et al. | 252/301.4 R |
| 2005/0253500 | A1 | 11/2005 | Gotoh et al. | |
| 2005/0267243 | A1 | 12/2005 | Amasaki et al. | |
| 2006/0006782 | A1 | 1/2006 | Nagatomi et al. | |
| 2006/0017365 | A1 | 1/2006 | Nagatomi et al. | |
| 2006/0021788 | A1 | 2/2006 | Kohayashi et al. | |
| 2006/0022573 | A1 | 2/2006 | Gotoh et al. | |
| 2006/0033083 | A1 | 2/2006 | Sakane et al. | |
| 2006/0043337 | A1 | 3/2006 | Sakane et al. | |
| 2006/0045832 | A1 | 3/2006 | Nagatomi et al. | |
| 2006/0065878 | A1 | 3/2006 | Sakane et al. | |
| 2006/0076883 | A1 | 4/2006 | Himaki et al. | |
| 2006/0091790 | A1 | 5/2006 | Nagatomi et al. | |
| 2006/0170332 | A1 | 8/2006 | Tamaki et al. | |
| 2006/0197432 | A1 | 9/2006 | Nagatomi et al. | |
| 2006/0197439 | A1 | 9/2006 | Sakane et al. | |
| 2006/0220047 | A1 | 10/2006 | Nagatomi et al. | |
| 2006/0220520 | A1 | 10/2006 | Sakane et al. | |
| 2006/0244356 | A1 | 11/2006 | Nagatomi et al. | |
| 2007/0007494 | A1 | 1/2007 | Hirosaki et al. | |
| 2007/0029525 | A1 | 2/2007 | Gotoh et al. | |
| 2007/0164308 | A1 | 7/2007 | Yoshimura et al. | |

FOREIGN PATENT DOCUMENTS

| | | | |
|---|---|---|---|
| EP | 1 445 295 | A1 | 8/2004 |
| EP | 1 696 016 | | 8/2006 |
| JP | 05-015655 | | 1/1993 |
| JP | 05-198433 | | 8/1993 |
| JP | 05-198433 | A | 8/1993 |
| JP | 11-144938 | | 5/1999 |
| JP | 11-277527 | | 10/1999 |
| JP | 2000-073052 | A | 3/2000 |
| JP | 2000-073053 | | 3/2000 |
| JP | 2000-153167 | | 6/2000 |
| JP | 2001-214162 | | 8/2001 |
| JP | 2002-363554 | | 12/2002 |
| JP | 2003-013059 | | 1/2003 |
| JP | 2003-096446 | | 4/2003 |
| JP | 2003-124527 | | 4/2003 |
| JP | 2003-515655 | | 7/2003 |
| JP | 2003-277746 | | 10/2003 |
| JP | 2003-336059 | | 11/2003 |
| JP | 2004-055536 | | 2/2004 |
| JP | 2004-055910 | | 2/2004 |
| JP | 2004-505470 | | 2/2004 |
| JP | 2004-067837 | | 3/2004 |
| JP | 2004-145718 | | 5/2004 |
| JP | 2004-166058 | | 6/2004 |
| JP | 2004-186278 | | 7/2004 |
| JP | 2004-189997 | | 7/2004 |
| JP | 2004-207271 | | 7/2004 |
| JP | 2004-235598 | | 8/2004 |
| JP | 2004-248405 | | 8/2004 |
| JP | 2004-250920 | | 8/2004 |
| JP | 2004-253312 | | 8/2004 |
| JP | 2004-244560 | | 9/2004 |
| JP | 2004-055536 | | 12/2004 |
| JP | 2004-368153 | | 12/2004 |
| JP | 2005-075854 | | 3/2005 |
| JP | 2005-103429 | | 3/2005 |
| JP | 2005-105126 | | 3/2005 |
| JP | 2005-192691 | | 6/2005 |
| JP | 2005-344025 | | 12/2005 |
| JP | 2006-028295 | | 2/2006 |
| JP | 2006-063214 | | 3/2006 |
| JP | 2006-063286 | | 3/2006 |
| JP | 2006-070109 | | 3/2006 |
| JP | 2006-176546 | | 7/2006 |
| JP | 2006-282809 | | 10/2006 |
| JP | 2006-282872 | | 10/2006 |
| WO | WO 01/40403 | A1 | 6/2001 |
| WO | WO-02/11214 | | 2/2002 |
| WO | WO-2004/030109 | A1 | 4/2004 |
| WO | WO 2004/039915 | A1 | 5/2004 |
| WO | WO 2004/055910 | A1 | 7/2004 |
| WO | WO 2005/052087 | A1 | 6/2005 |
| WO | WO-2006/093298 | A1 | 9/2006 |

OTHER PUBLICATIONS

US Office Action received in U.S. Appl. No. 13/100,751 dated May 30, 2012.

US Office Action received in U.S. Appl. No. 13/100,751 dated Jan. 27, 2012.

US Office Action Ex parte Quayle dated Jun. 5, 2014 issued in U.S. Appl. No. 13/414,703.

Notice of Allowance issued in U.S. Appl. No. 13/414,703 dated Dec. 29, 2014.

Ex Parte Quayle in U.S. Appl. No. 13/414,704 dated Nov. 18, 2013.

Non-Final Office Action in U.S. Appl. No. 13/414,704 dated Mar. 13, 2013.

Notice of Allowance in U.S. Appl. No. 13/414,704 dated Mar. 21, 2014.

Office Action in U.S. Appl. No. 13/414,703 dated Mar. 13, 2013.

Office Action in U.S. Appl. No. 13/414,703 dated Nov. 18, 2013.

Uheda, et al. "The Crystal Structure and Photoluminescenece Properties of a New Red Phosphor, Calcium Aluminum Silicon Nitride Doped With Divalent Europium", 206th Meeting of Electrochemical Society, Oct. 3, 2004.

"Phosphor Handbook"; (compiled by Phosphor Research Society, published by Ohmusha. Ltd., 1987); pp. 172-176.

U.S. Appl. No. 10/984,772, filed Nov. 10, 2004, Nagatomi et al.

U.S. Appl. No. 11/061,669, filed Feb. 22, 2005, Nagatomi et al.

U.S. Appl. No. 11/063,847, filed Feb. 23, 2005, Sakane et al.

U.S. Appl. No. 11/149,317, filed Jun. 10, 2005, Nagatomi et al.

U.S. Appl. No. 11/149,192, filed Jun. 10, 2005, Sakane et al.

U.S. Appl. No. 11/198,281, filed Aug. 8, 2005, Nagatomi et al.

U.S. Appl. No. 11/194,590, filed Aug. 2, 2005, Gotoh et al.

U.S. Appl. No. 11/211,751, filed Aug. 26, 2005, Sakane et al.

U.S. Appl. No. 11/218,504, filed Sep. 6, 2005, Nagatomi et al.

JIS Z 8726; "Method of Specifying Colour Rendering Properties of Light Sources", (1990).

* cited by examiner

PHOSPHOR FOR ELECTRON BEAM EXCITATION AND COLOR DISPLAY DEVICE USING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a phosphor which emits light by electron beam excitation, and particularly to a phosphor which can be favorably used for a color display device using an electron beam, such as a color cathode-ray tube and a field emission display (hereinafter, described as "FED").

2. Description of the Related Art

A phosphor for electron beam excitation, which emits light by being excited by the electron beam, is conventionally used for a color cathode-ray tube, and is further used for an FED which is a thin planar display which has been developed in recent years. As phosphors for electron beam excitation used for a color display device such as a color cathode-ray tube and an FED, ZnS:Ag,Cl is known as a blue phosphor, and ZnS:Cu,Al is known as a green phosphor. $Y_2O_2S:Eu^{3+}$, $Y_2O_3:Eu^{3+}$, $YVO_4:Eu^{3+}$ and the like are known as red phosphors, and among them, $Y_2O_2S:Eu^{3+}$ is widely used in the existing color cathode-ray tubes for the reason of excellent light emission color and high brightness.

Corresponding to the demand for enhancement in definition and contrast of a display image for the recent color cathode-ray tubes, the measures for increasing the density of the electron beam which is irradiated to the phosphors is taken, but in the case of using $Y_2O_2S:Eu^{3+}$ as a red phosphor, the phenomenon, which is called brightness saturation, in which brightness is saturated when the rise in the brightness reaches a fixed degree or higher, occurs, even if the density of the electron beam is increased. This is considered to be because a temperature quenching phenomenon occurs in the red phosphor due to a rise in temperature of the phosphor film. The brightness saturation phenomenon causes that problems that the emission efficiency of the red phosphor in the color cathode-ray tube is reduced, image degradation of the display screen occurs during operation of the color cathode ray, and chromaticness of white color displayed in mixed color of RGB is changed significantly due to reduction in brightness in red light.

Several proposals are made to prevent the saturation phenomenon of the brightness, and there is the description that the occurrence of the brightness saturation is decreased by doping a very small amount of $Tb^{3+}$ or $Pr^{3+}$ to $Y_2O_2S:Eu^{3+}$, for example, in Non-patent Document 1. Patent Document 1 makes proposal to enhance brightness by doping a very small amount of one or both of $Tb^{3+}$ and $Pr^{3+}$, and Ca to $Y_2O_2S:Eu^{3+}$, and Patent Document 2 makes a proposal to enhance brightness by doping a very small amount of one or both of $Tb^{3+}$ and $Pr^{3+}$, and one or both of Sm and Nd to $Y_2O_2S:Eu^{3+}$.

[Non-patent Document 1] page 172 to page 176 of "Phosphor Handbook" (compiled by Phosphor Research Society, published by Ohmusha, Ltd., 1987)

[Patent Document 1] Japanese Patent Application Laid-open No. 2003-13059

[Patent Document 2] Japanese Patent Application Laid-open No. 2000-73053

However, in the cathode-ray tubes which are used in a high-definition television, a high definition computer display and the like which are the color display devices of recent years, making the phosphors finer particles is demanded to achieve enhancement in definition and contrast of the displays. With this, density of the electron beam irradiated to the phosphors tends to increase, and therefore the brightness saturation occurs even in the case of using the aforementioned improved $Y_2O_2S:Eu^{3+}$ phosphor to make it difficult to obtain sufficient brightness, thus causing the problem of reducing brightness and color balance of the screen due to insufficient brightness in red light to make it difficult to obtain high-definition screen.

SUMMARY OF THE INVENTION

The present invention is made to solve the aforementioned problems, and an object of the present invention is to provide a phosphor for electron beam excitation having electron beam excitation properties that less reduction in emission efficiency occurs and high brightness can be kept even if density of the electron beam increases, particularly, provide a phosphor for electron beam excitation emitting red light having sufficient brightness, and further to provide a color display device using the phosphor for electron beam excitation.

As a result of carrying forward the study on the host material compositions of various phosphors for the aforementioned problems, the inventors has found out that the phosphor expressed by a composition formula of MmAaBbOoNn:Z (where an element M is one or more bivalent elements, an element A is one or more trivalent elements, an element B is one or more tetravalent elements, O is oxygen, N is nitrogen, an element Z is an activator, $m>0$, $a>0$, $b>0$, $o\geq 0$, and $n=2/3m+a+4/3b-2/3o$) keeps light emission with high efficiency and high brightness even if the density of the electron beam increases, and completed the present invention.

Namely, a first constitution to solve the aforesaid problems is a phosphor for electron beam excitation characterized by being expressed by a composition formula of MmAa BbOoNn:Z (where an element M is one or more bivalent elements, an element A is one or more trivalent elements, an element B is one or more tetravalent elements, O is oxygen, N is nitrogen, an element Z is an activator, $m>0$, $a>0$, $b>0$, $o\geq 0$, and $n=2/3m+a+4/3b-2/3o$).

A second constitution is the phosphor for electron beam excitation according to the first constitution, characterized in that the value of each of the m, a and b is $m=a=b=1$.

A third constitution is the phosphor for electron beam excitation according to the first constitution or the second constitution, characterized in that the element M is one or more elements selected from Mg (magnesium), Ca (calcium), Sr (strontium), Ba (barium) and Zn (zinc), the element A is one or more elements selected from B (boron), Al (aluminum) and Ga (gallium), the element B is Si (silicon) and/or Ge (germanium), and the element Z is one or more elements selected from rare earth or transition metals.

A fourth constitution is the phosphor for electron beam excitation according to any one of the first constitution to the third constitution, characterized in that the element A is Al (aluminum), and the element B is Si (silicon).

A fifth constitution is the phosphor for electron beam excitation according to any one of the first constitution to the fourth constitution, characterized in that the element M is Ca (calcium) and the element Z is Eu (europium).

A sixth constitution is the phosphor for electron beam excitation according to any one of the first constitution to the fifth constitution, characterized in that the phosphor for electron beam excitation is expressed by a general formula of $CaAlSiN_3$:Eu.

A seventh constitution is the phosphor according to any one of the first constitution to the sixth constitution, characterized in that the phosphor for electron beam excitation is in a powder form.

An eighth constitution is the phosphor for electron beam excitation according to the seventh constitution, characterized in that an average particle size of the phosphor for electron beam excitation is from 1 μm to 10 μm inclusive.

A ninth constitution is a color display device, characterized in that the phosphor for electron beam excitation according to any one of the first constitution to the eighth constitution is used.

In the phosphor for electron beam excitation according to the first to the fifth constitutions, brightness saturation hardly occurs even if the density of the electron beam increases, and the phosphor keeps light emission with high efficiency and high brightness.

In the phosphor for electron beam excitation according to the sixth constitution, brightness saturation hardly occurs even if the current density of the electron beam increases, and the phosphor keeps light emission with high efficiency and high brightness, and emits red light having sufficient brightness.

The phosphor for electron beam excitation according to the seventh or the eighth constitution is in a powder form, and therefore is easily coated or charged.

In the color display device according to the ninth constitution, insufficient brightness in red light does not occur even if the density of the electron beam is increased, and the high-definition screen can be obtained.

DETAILED DESCRIPTION OF THE PREFERRED EMBODIMENT(S)

Figure 1:
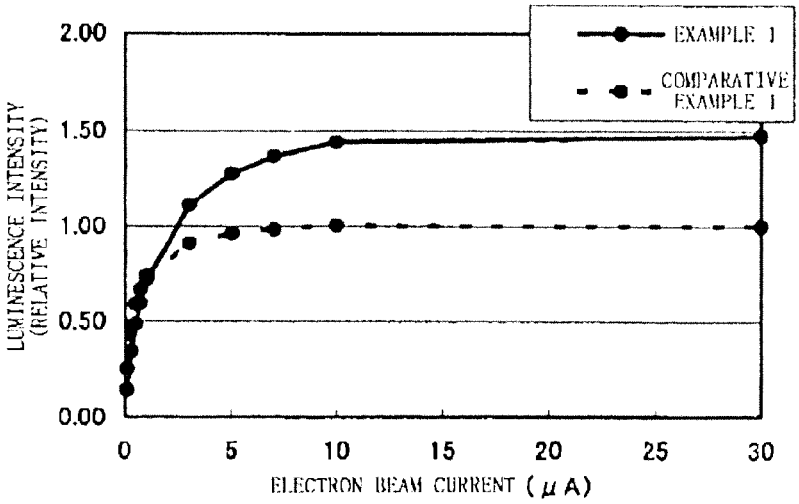
FIG. 1 is a graph showing the relationship between the electron beam current irradiated to a phosphor, and luminescence intensity of the phosphor.

A phosphor for electron beam excitation according to the present invention (hereinafter, simply described as a phosphor in some cases) is a phosphor expressed by the composition formula of MmAaBbOoNn:Z. Here, element M is at least one or more bivalent elements. Element A is one or more trivalent elements. Element B is one or more tetravalent elements. O represents oxygen and N represents nitrogen. Element Z is an element which acts as an activator, and is at least one or more elements selected from rare-earth elements or transition-metal elements. In the phosphor according to the present invention which has the composition, brightness saturation hardly occurs even if the density of the electron beam increases, and light emission with high brightness and high efficiency can be obtained.

When the phosphor takes a chemically stable structure, an impurity phase which does not contribute to light emission is difficult to generate in the structure, and therefore reduction in the light emission properties can be suppressed, which is a preferable constitution. Therefore, in order to allow the phosphor to take a chemically stable structure, it is preferable that the phosphor has the structure which is expressed by $m>0$, $a>0$, $b>0$, $o\geq 0$, and $n=2/3m+a+4/3b-2/3o$, when the phosphor is expressed by the aforementioned composition formula of MmAaBbOoNn:Z.

Further, it is preferable that the value of the aforesaid m, a and b is $m=a=b=1$, and it is preferable that the aforesaid element M is one or more elements selected from Mg, Ca, Sr, Ba and Zn, the aforesaid element A is one or more elements selected from B (boron), Al and Ga, the aforesaid element B is Si and/or Ge, and the aforesaid element Z is one or more elements selected from rare-earth elements or transition-metal elements.

Further, when $m=a=b=1$, the aforesaid element A is Al, and element B is Si in the aforementioned composition formula of MmAaBbOoNn:Z, the phosphor becomes the phosphor expressed by the general formula of MAlSiOoNn:Z (where $o\geq 0$, $n=3-2/3o$), and becomes the phosphor which exhibits light emission with high efficiency and high brightness when being excited by an electron beam. The phosphor is capable of shifting emission wavelength by changing the kind of the element M, and the O content, and therefore when a change in the emission wavelength is required as the phosphor for a display device such as a display, optimal emission color can be obtained by changing the kind of the element M and the amount of O.

Further, when $o=0$, the aforesaid element M is Ca, and the element Z is Eu in the aforementioned composition formula of MAlSiOoNn:Z, the phosphor becomes the phosphor expressed by $CaAlSiN_3:Eu^{2+}$. The phosphor expressed by the general formula of $CaAlSiN_3:Eu^{2+}$ especially shows red light emission with high efficiency and high brightness and becomes an excellent red phosphor, when excited by an electron beam.

$Y_2O_2S:Eu^{3+}$ phosphors used for a number of color cathode-ray tubes at present have red pigment such as $Fe_2O_3$ attached onto the phosphor surfaces in order to enhance contrast of images shown on displays, but since the aforementioned phosphor expressed by $CaAlSiN_3:Eu^{2+}$ well absorbs visible light of a wavelength of 550 nm or less, the phosphor itself is colored in red, and therefore it provides the effect of being capable of reducing the use amount of pigment necessary for enhancement of contrast, in addition.

The phosphor according to the present invention is in a powder form in consideration of easiness of coating or charging, and it is preferable that the average particle size of the powder of the phosphor is preferably 10 μm or less. The reason of this is as follows: since light emission is considered to occur mainly on the particle surface in the powder of the phosphor, the surface area for powder unit weight can be ensured and reduction in brightness can be avoided if the average particle size is 10 μm or less. If the average particle size is 10 μm or less, when the powder of the phosphor is formed into a paste and coated on an light emitting element or the like, the coating density of the powder of the phosphor can be enhanced, and from this point of view, reduction in brightness can be avoided. Further, from the viewpoint of enhancement in definition of the display, it is also preferable that the average particle size of the powder of the phosphor is 10 μm or less. Meanwhile, according to the study of the inventors, it has been found out that the average particle size of the powder of the phosphor is preferably 0.1 μm or more from the viewpoint of the emission efficiency of the phosphor powder, though the detailed reason is unknown. From the above, it is preferable that the average particle size of the powder of the phosphor according to the present invention is from 0.1 μm to 10 μm inclusive.

When a color display device such as a color cathode-ray tube and an FED is produced by using the phosphor according to the present invention, less reduction in the emission efficiency occurs even if the density of the electron beam is increased, and it becomes possible to keep high screen display brightness, thus making it possible to obtain a color display device which realizes the excellent high-definition screen in brightness of the screen and color balance. When the phosphor according to the present invention is applied to the color display device, the phosphor can be applied to the color display device by using the similar technique to the phosphor according to the prior art.

(Production Method of Phosphor)

The production method of the phosphor according to the present invention will be explained by taking the example of $CaAlSiN_3$:Eu (where Eu/(Ca+Eu) mole ratio=0.015) in the composition formula of MmAaBbOoNn:Z where the element M is Ca, the element A is Al, the element B is Si, m=a=b=1, and o=0 as an example of production method in the case without including oxygen in the composition formula of MmAaBbOoNn:Z.

First, as the raw material, $Ca_3N_2$(2N), AlN(3N), and $Si_3N_4$ (3N) are prepared respectively as nitrides of Ca, Al and Si. As a raw material of Eu, $Eu_2O_3$(3N) is prepared.

These raw materials are weighed so that the mole ratio of each element satisfies m=a=b=1, and mixed. A part of Ca site is replaced with Eu, and therefore the raw materials are actually weighed so that (Ca+Eu):Al:Si=1:1:1 is satisfied, and mixed. The mixing may be performed according to an ordinary mixing method using a mortar or the like, but it is convenient to perform the operation in a glove box under inert atmosphere such as nitrogen.

The reason why the mixing operation inside the glove box under the inert atmosphere is convenient is that there is the possibility that the operation in air breaks the rate of oxygen concentration included in the elements constituting the host material due to oxidation and decomposition of the above-described raw material, and light emission properties are degraded, and in addition, it is considered that the composition of the produced phosphor is deviated from the target composition. Further, the nitride of each of the raw materials is susceptible to moisture, and therefore it is advisable to use the inert gas from which moisture is sufficiently removed. When a nitride raw material is used as each raw material, the mixing method is preferably dry mixing to avoid decomposition of the raw material, and more specifically, an ordinary dry mixing method using a ball mill, a mortar or the like may be adopted.

The raw materials completed to be mixed are charged into a crucible made of boron nitride as a firing container, and are fired under the inert atmosphere such as nitrogen. Here, the firing temperature is 1000° C. or more, and is preferably 1400° C. or more. The holding time can be shortened since the firing advances more quickly as the firing temperature is higher. Even if the firing temperature is low, the target light emission properties can be obtained by holding the raw material for a long time. This is because the longer the firing time, the more the particle growth advances, and the particle size becomes larger. Thus, it is suitable to set optional firing time in accordance with the target particle size. For example, when firing is made at, for example, 1500° C., it is preferable to raise the temperature at the temperature raising speed of 15° C./min up to 1500° C., and thereafter fire the raw materials by holding them at 1500° for three hours.

After the firing is completed, the fired materials are cooled from 1500° C. to 200° C. in an hour, and after the fired materials are further cooled to room temperature, the fired materials are ground to be in a predetermined average particle size (preferably 1 μm to 10 μm) by using grinding means such as a mortar, and a ball mill, and thereby the phosphor of the composition formula of $CaSiAlN_3$:Eu(Eu/(Ca+Eu) mole ratio=0.015) can be produced.

It is considered that minute quantities of oxygen exist in the composition of the product due to oxygen from $Eu_2O_3$, but they can be ignored in the ordinary case.

When the set value of Eu/(Ca+Eu) mole ratio is desired to change, the compounding amount of each raw material at the time of preparation is set at a predetermined composition formula, and thereby the phosphor of the predetermined composition can be produced by the similar method to the aforementioned production method.

Next, a production method of $CaAlSiO_{0.5}N_{2.67}$:Eu (where Eu/(Ca+Eu) mole ratio=0.015) where the element M is Ca, the element A is Al, the element B is Si, m=a=b=1, and o=0.5 will be explained, as an example of a production method in the case of including oxygen in the composition formula of MmAaBbOoNn:Z (namely, o≠0), First, as the raw material, $Ca_3N_2$(2N), AlN(3N), $Si_3N_4$(3N) are prepared respectively as nitrides of Ca, Al and Si, and as the raw material of O, CaO(2N) is prepared. In this case, as the raw material of O, $Al_2O_3$, $SiO_2$ or the like may be used. As a raw material of Eu, $Eu_2O_3$(3N) is prepared.

These raw materials are weighed so that m=a=b=1 and o=0.5 are satisfied, and mixed. A part of Ca site is replaced with Eu, and therefore the raw materials are actually weighed so that (Ca+Eu):Al:Si=1:1:1 is satisfied, and mixed. The amount of O which provides o=0.5 is adjusted by controlling the doping ratio of $Ca_3N_2$ and CaO when, for example, CaO is used as a raw material for supplying O. Namely, in order to obtain the target composition of $CaAlSiO_{0.5}N_{2.67}$:Eu (Eu/(Ca+Eu) mole ratio=0.015), it is suitable to weigh the respective raw materials so that $Ca_3N_2$: $Eu_2O_3$: CaO: AlN:$Si_3N_4$= (0.985−0.50)/3:0.015/2:0.50:1:1/3 is satisfied, and mix them. When $Al_2O_3$ is used as the raw material for supplying O, it is suitable to adjust the amount of O by the doping ratio of $Al_2O_3$ and AlN, and when $SiO_2$ is used as the raw material for supplying O, it is suitable to adjust the amount of O by the doping ratio of $SiO_2$ and $Si_3N_4$. The mixing may be performed according to an ordinary mixing method using a mortar or the like, but it is convenient to perform the operation in a glove box under inert atmosphere such as nitrogen.

The weighing and mixing operation which is performed inside the glove box under the inert atmosphere is convenient. The nitride of each of the raw materials is susceptible to moisture, and therefore it is advisable to use the inert gas from which moisture is sufficiently removed. When a nitride raw material is used as each raw material element, the mixing method is preferably dry mixing to avoid decomposition of the raw materials, and an ordinary dry mixing method using a ball mill, a mortar or the like may be adopted.

The raw materials completed to be mixed are put into a crucible, and are held and fired at 1000° C. or more, preferably at 1400° C. or more, and more preferably at 1500° C. under the inert atmosphere such as nitrogen for three hours. The holding time can be shortened as the firing temperature is higher, because the firing advances more quickly. On the other hand, even when the firing temperature is low, the target light emission properties can be obtained by keeping the firing temperature for a long time. However, the longer the firing time, the more the particle growth advances, and the particle size becomes larger. Therefore, it is suitable to set the firing time in accordance with the target particle size.

The material of the crucible in use is preferably the material usable in the inert atmosphere such as BN (boron nitride), alumina, carbon, silicon nitride, aluminum nitride, sialon and SiC, and the crucible with high purity is preferable. Among them, use of the crucible made of BN (boron nitride) with high purity is preferable because inclusion of the impurities from the crucible can be avoided. After the firing is completed, the fired object is taken out of the crucible, ground by using the grinding means such as a mortar and a ball mill so that a predetermined average particle size is obtained, and the phosphor expressed by the composition formula of $CaAlSiO_{0.5}N_{2.67}$:Eu can be produced. However, since $Eu_2N_3$ is doped to replace the Ca site with Eu, a part of nitrogen which should have been taken into the phosphor from $Ca_3N_2$ is replaced with oxygen from $Eu_2O_3$, and the composition of the product becomes $CaAlSiO_{0.523}N_{2.66}$:Eu. Therefore, it is considered that very small deviations occur to the compositions of oxygen and nitrogen, but they can be ignored in the ordinary case.

EXAMPLES

Hereinafter, based on the examples, the present invention will be explained more specifically.

Example 1

Commercially available $Ca_3N_2$(2N), AlN(3N), $Si_3N_4$(3N), $Eu_2O_3$(3N) were prepared, and after each raw material was weighed so that the mole ratio of each of the elements satisfies Ca:Al:Si:Eu=0.985:1:1:0.015, the raw materials were mixed by using the mortar in the glove box under the nitrogen atmosphere. After the mixed raw materials were charged into the crucible made of boron nitride, the temperature of the raw materials was raised to 1500° C. at the temperature rising speed of 15° C./min. under the nitrogen atmosphere, and after the raw materials were held at 1500° C. for three hours and fired, the fired materials were cooled from 1500° C. to 200° C. in an hour and further cooled to the room temperature, thereby obtaining the phosphor of the composition formula of $Ca_{0.985}SiAlN_3$:$Eu_{0.015}$ was obtained. The average particle size of the powder made by grinding the obtained phosphor using the mortar was 4.65 μm.

The powder of the produced phosphor was dissolved into the solution, and is uniformly coated on a copper substrate by using the coagulating sedimentation using water glass to make the substrate specimen for evaluating light emission properties of the phosphor according to the example 1. Excitation of the produced substrate specimen was performed by 25 keV electron beam scanned on 8×4 mm raster area, and luminescence intensity of substrate specimen when the beam current was changed from 0.1 μA to 30 μA was measured. The measurement result is shown in Table 1 and FIG. 1. The luminescence intensity is expressed with relative intensity, which is the standardized value where the luminescence intensity when the beam current of 30 μA is passed to the substrate specimen of the phosphor according to comparative example 1 which will be described later is set as 1.00. In FIG. 1 is a graph in which the beam current value is plotted in the horizontal axis and the luminescence intensity (relative intensity) of the phosphor is plotted in the vertical axis, and the values in Table 1 are plotted by the solid line.

Figure 2:
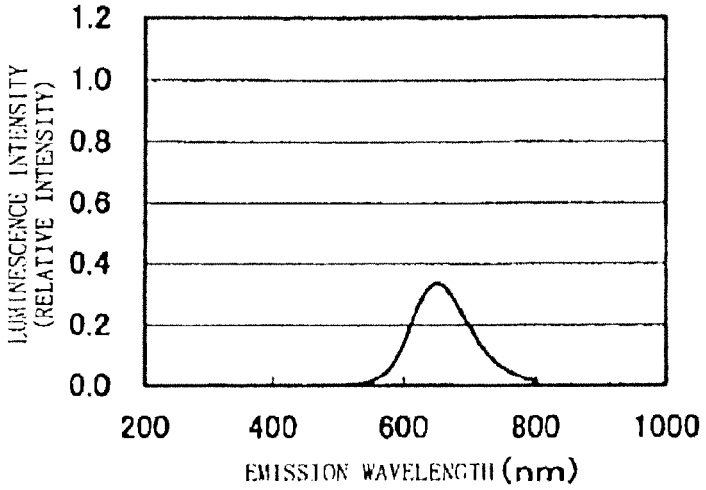
FIG. 2 is a graph showing an emission spectrum of a phosphor according to an example 1.

The emission spectrum was measured by irradiating the electron beam with the beam current value being set at 10 μA to the phosphor specimen. The measurement result is shown in FIG. 2. In FIG. 2, the luminescence intensity of the phosphor according to the example 1 is plotted in the vertical axis, and the wavelength of light is plotted in the horizontal axis. The luminescence intensity is expressed with the relative intensity, and is the value standardized by setting the relative intensity of the luminescence intensity, which is obtained when the electron beam with the beam current value being set at 10 μA is irradiated to the substrate specimen of the phosphor according to the comparative example 1 which will be described later, at 1.00. As shown in FIG. 2, the phosphor specimen shows the emission spectrum with wide half band width having the peak at 653.5 nm. The luminance when the electron beam with the beam current value being set at 10 μA is irradiated to the phosphor specimen was measured. The measurement result is shown in Table 2.

Comparative Example 1

Figure 3:
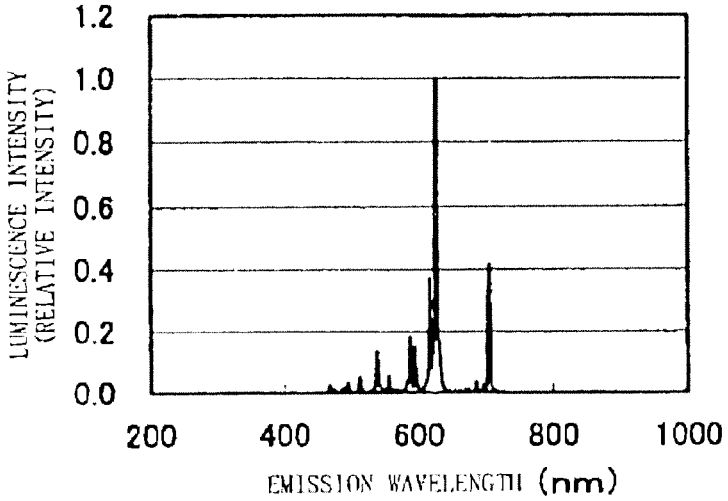
FIG. 3 is a graph showing an emission spectrum of a phosphor according to a comparative example.

By using $Y_2O_2S$:$Eu^{3+}$, which is a commercially available red phosphor for a color cathode-ray tube, as the phosphor according to the comparative example, the substrate specimen according to the comparative example 1 was produced as in the example 1, and the luminescence intensity of the substrate specimen when the beam current value of the electron beam was changed from 0.1 μA to 30 μA, and the luminance and emission spectrum when the electron beam with the beam current value being set at 10 μA was irradiated were measured. The measurement result of the luminescence intensity is shown in Table 1, and is plotted into FIG. 1 by using the broken line. The measurement result of the emission spectrum is shown in FIG. 3. In FIG. 3, the luminescence intensity of the phosphor is plotted in the vertical axis as the relative intensity, and the wavelength of light is plotted in the horizontal axis, as in FIG. 2.

TABLE 1

| | LUMINESCENCE INTENSITY (RELATIVE INTENSITY) | |
|---|---|---|
| ELECTRON BEAM CURRENT (μA) | EXAMPLE 1 | COMPARATIVE EXAMPLE 1 |
| 0.1 | 0.14 | 0.25 |
| 0.3 | 0.34 | 0.48 |
| 0.5 | 0.49 | 0.59 |
| 0.7 | 0.60 | 0.67 |
| 1 | 0.72 | 0.74 |
| 3 | 1.11 | 0.91 |
| 5 | 1.28 | 0.96 |
| 7 | 1.37 | 0.98 |
| 10 | 1.44 | 1.00 |
| 30 | 1.48 | 1.00 |

TABLE 2

| | LUMINANCE (RELATIVE INTENSITY) |
|---|---|
| EXAMPLE 1 | 1.57 |
| COMPARATIVE EXAMPLE 1 | 1.00 |

Comparison between Example 1 and Comparative Example 1

As is obvious from Table 1 and FIG. 1, the phosphor according to the example 1 turned out to be higher in the luminescence intensity as compared with commercially available $Y_2O_2S:Eu^{3+}$, which is the comparative example 1, when the electron beam with the beam current value being set at 30 μA or more was irradiated. When the electron beam with the beam current value being set at 7 μA or more was irradiated to the phosphor of the comparative example 1, the phosphor was approximately in the brightness saturation state, while the phosphor according to the example 1 was not in the brightness saturation state even when the electron beam with the beam current value being set at 10 μA or more was irradiated. As a result, when the electron beam with the beam current value being set at 30 μA or more was irradiated to both phosphors, the luminescence intensity of the example 1 was 1.48 times as high as that of the comparative example 1. Namely, it has been found out that the brightness saturation hardly occurs in the phosphor according to the present invention, and intense light emission can be obtained by increasing the electron beam current irradiated.

As is obvious from Table 2, the luminance, which was obtained when the electron beam with the beam current value being set at 10 μA or more was irradiated to the phosphor specimen according to the example 1, turned out to show the luminance of 1.57 times as high as the luminance of the commercially available $Y_2O_2S:Eu^{3+}$ according to the comparative example 1.

Further, as for the emission spectrum, while the commercially available $Y_2O_2S:Eu^{3+}$ according to the comparative example 1 showed the emission spectrum having the sharp peak at 626.2 nm, the phosphor specimen according to the example 1 showed the emission spectrum with the wide half band width having the peak at 653.5 nm. It has been found out that the energy of light emission expressed by the area surrounded by the curve of the emission spectrum of the phosphor specimen according to the example 1 is about three times as large as that of the phosphor specimen according to the comparative example 1.

From the above, the phosphor according to the example 1 has less reduction in the emission efficiency even when the density of the electron beam increases, and is capable of keeping high brightness, and therefore it is considered to be suitable as a red phosphor for a color display device using the phosphor for electron bean excitation.

What is claimed is:

[1. A phosphor for electron beam excitation expressed by a composition formula of MmAaBbOoNn:Z (where an element M is one or more bivalent elements, an element A is one or more trivalent elements, an element B is one or more tetravalent elements, O is oxygen, N is nitrogen, an element Z is an activator, and where values of m=a=b=1, o≥0, and n=2/3m+a+4/3b−2/3o).]

[2. The phosphor for electron beam excitation according to claim 1, wherein the element M is one or more elements selected from Mg (magnesium), Ca (calcium), Sr (strontium), Ba (barium) and Zn (zinc), the element A is one or more elements selected from B (boron), Al (aluminum) and Ga (gallium), the element B is Si (silicon) and/or Ge (germanium), and the element Z is one or more elements selected from rare earth or transition metals.]

[3. The phosphor for electron beam excitation according to claim 1, wherein the element A is Al (aluminum), and the element B is Si (silicon).]

[4. The phosphor for electron beam excitation according to claim 1, wherein the element M is Ca (calcium) and the element Z is Eu (europium).]

[5. The phosphor for electron beam excitation according to claim 1, wherein said phosphor for electron beam excitation is expressed by a general formula of $CaAlSiN_3:Eu$.]

[6. The phosphor according to claim 1, wherein said phosphor for electron beam excitation is in a powder form.]

[7. The phosphor for electron beam excitation according to claim 6, wherein an average particle size of said phosphor for electron beam excitation is from 1 μm to 10 μm inclusive.]

[8. A color display device, wherein the phosphor for electron beam excitation according to claim 1 is used.]

9. A method of exciting a phosphor to emit light by electron beam irradiation, comprising:

providing a phosphor expressed by a composition formula of MmAaBbOoNn:Z, where an element M is one or more bivalent elements, an element A is one or more trivalent elements, an element B is one or more tetravalent elements, O is oxygen, N is nitrogen, and an element Z is an activator, and where values of [m>0, a>0, b>0,] o≥0, where values of m=a=b=1, and n=2/3m+a+4/3b−2/3o[)]; and irradiating the phosphor with an electron beam.

*10. The method of claim 9, wherein the element M is one or more elements selected from Mg (magnesium), Ca (calcium), Sr (strontium), Ba (barium) and Zn (zinc), the element A is one or more elements selected from B (boron), Al (aluminum) and Ga (gallium), the element B is Si (silicon) and/or Ge (germanium), and the element Z is one or more elements selected from rare earth or transition metals.*

*11. The method of claim 9, wherein the element A is Al (aluminum), and the element B is Si (silicon).*

*12. The method of claim 9, wherein the element M is Ca (calcium) and the element Z is Eu (europium).*

*13. The method of claim 9, wherein said phosphor for electron beam excitation is expressed by a general formula of $CaAlSiN_3:Eu$.*

*14. The method of claim 9, wherein said phosphor is in a powder form.*

*15. The method of claim 14, wherein an average particle size of said phosphor for electron beam excitation is from 1 μm to 10 μm inclusive.*

* * * * *